(12) United States Patent
Cases

(10) Patent No.: US 6,644,572 B1
(45) Date of Patent: Nov. 11, 2003

(54) LAMINAR POLYOLEFINE PLASTIC MATERIAL RECYCLING INSTALLATION

(76) Inventor: Josep Peruga Cases, Ronda del Canigó, Agrupació 6, Casa 9, 08950-Esplugues de Llobregat (Barcelona) (ES)

(*) Notice: Subject to any disclaimer, the term of this patent is extended or adjusted under 35 U.S.C. 154(b) by 0 days.

(21) Appl. No.: 09/937,123

(22) PCT Filed: Feb. 18, 2000

(86) PCT No.: PCT/ES00/00057
§ 371 (c)(1),
(2), (4) Date: Sep. 20, 2001

(87) PCT Pub. No.: WO00/56512
PCT Pub. Date: Sep. 28, 2000

(30) Foreign Application Priority Data

Mar. 22, 1999 (ES) .................................. 9900568

(51) Int. Cl.⁷ .............................................. B02C 19/12
(52) U.S. Cl. ..................... 241/76; 241/79.1; 241/81; 241/152.2
(58) Field of Search ................... 241/20, 81, 79.1, 241/76, 77, 78, 29, 152.1, 152.2

(56) References Cited

U.S. PATENT DOCUMENTS

| | | |
|---|---|---|
| 4,483,768 A | 11/1984 | Gazzoni |
| 4,728,045 A | 3/1988 | Tomaszek |
| 5,351,895 A | 10/1994 | Brooks et al. |
| 5,358,390 A | 10/1994 | Jager |
| 5,375,778 A | 12/1994 | Lundquist |
| 5,948,276 A | * 9/1999 | Neureither et al. ......... 210/772 |

FOREIGN PATENT DOCUMENTS

| | | |
|---|---|---|
| EP | 0 594 307 A1 | 4/1994 |
| EP | 0 662 379 B1 | 7/1995 |
| EP | 0 662 379 A1 | 7/1995 |

* cited by examiner

*Primary Examiner*—Mark Rosenbaum
(74) *Attorney, Agent, or Firm*—Scully, Scott, Murphy & Presser

(57) ABSTRACT

Equipment for the recycling of polyolefinic plastic sheeting material that comprises: breakers (6) for plastic material; separating devices (10) for separating material of higher density; crusher mills (26); and water separating tanks (62, 68), with a lower outlet and with a feeder that carries the material to the bottom (72) of the tank (62, 68); the equipment also comprises a pump (78) connected to the outlet (74) and equipped with an outlet (80); several movable devices (82) suitable for promoting suction flow of this water and materials through the inlet (76) and a propulsion flow through the outlet (80); and a motor (84) of variable speed suitable for driving the movable devices (82), such that a variation in the speed causes a variation in the flow rate of the flows.

8 Claims, 6 Drawing Sheets

LAMINAR POLYOLEFINE PLASTIC MATERIAL RECYCLING INSTALLATION

Figure 1:
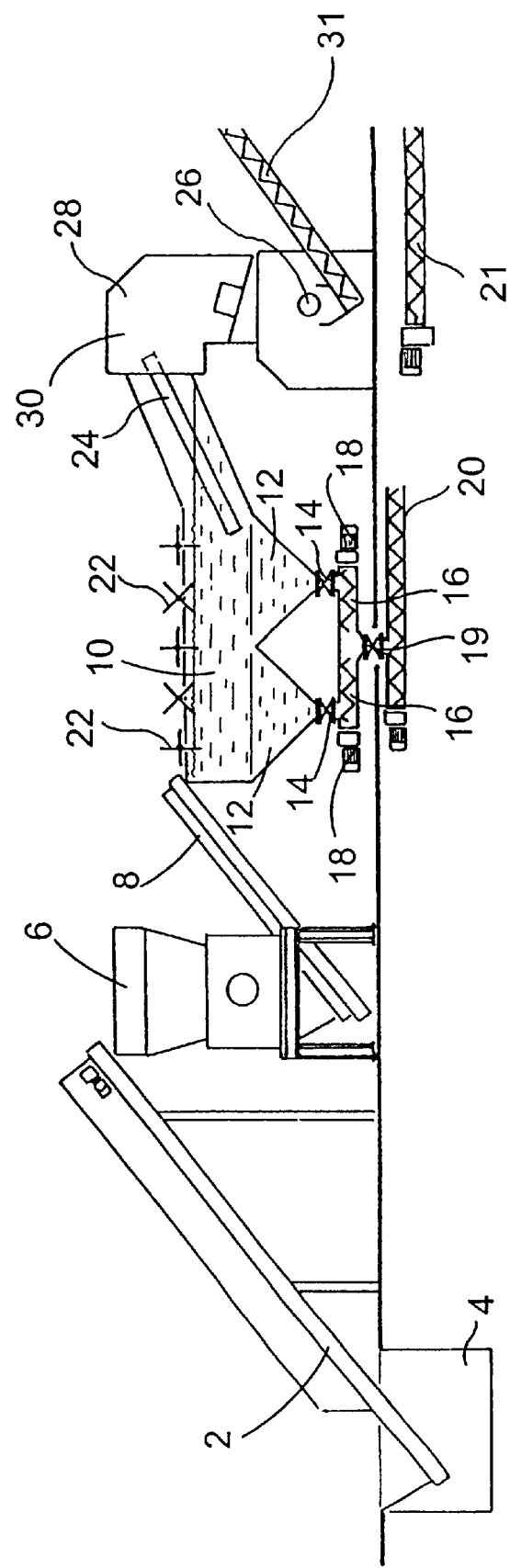

This invention refers to equipment for the recycling of polyolefinic plastic sheeting material, in which the equipment is of the type that comprises the following: [i] at least one breaker mechanism for the plastic material being recycled; [ii] at least one initial separating device to separate materials of higher density than that of this plastic material by means of flotation; [iii] at least one crushing mill to reduce this plastic material to small particles; [iv] at least one water-based separating tank that, on the one hand, is equipped with several blades for surface displacement of these small particles and, on the other, is equipped with a bottom with an outlet; each separating tank being equipped with a suitable feeder to receive the plastic material that has been crushed and, at least partially, separated from materials of higher density, delivering such material to the area near this bottom, there being an initial variable speed motor suitable to controlling this delivery; [v] means to separate this plastic material from this water; and [vi] means to bind the plastic material.

In particular, the aforesaid equipment refers to polyolefinic filler-free plastic sheeting material originating from sorted and separated rubbish, in other words, after being used (post-consumer) in polyethylenes (PE), polypropylenes (PP), ethylene vinyl acetate (EVA) and polybutylenes (PB); from now on, this description and these claims refer solely to these plastic materials, which have density (when not filled) under 1 g/cm$^3$.

As is known, the consumption of plastic sheeting materials is increasingly more frequent, being used preferably for wrappings and also to make container bags. This plastic sheeting material is normally thrown away after use, a fact that poses significant ecological problems, particularly when considering that the majority of these plastic materials are not biodegradable. As a result, current regulations and world-wide trends are encouraging recycling by creating infrastructures for the collection, sorting and recycling of plastics, such as containers and packing materials.

By recycling this plastic sheeting, the regulations are enforced, pollution decreases and an economic benefit is obtained through reduced imports of petroleum, from which these plastics are derived.

Nevertheless, typically existing facilities have disadvantages, among them we should mention those covered by the following remarks.

One of the important elements for a facility to recycle polyolefinic plastic sheeting material is that it consist of one or more water separating tanks; these have an inverted trunco-conical bottom and when there are more than one, these tanks are connected one above the other, thereby creating levels between the tanks; in addition they have identical descending vertical feeders, that are immersed in the aforesaid tanks and, by means of screw conveyors, carry the chopped plastic material to the area near the bottom of the separating tank.

Once there, the plastic material having a density lower than water, tends to rise toward the surface of the water in the tank. In contrast, materials with a higher density, plastics, etc. (and that cannot be used) tend to remain at the bottom of the tank and an adjustable outlet is provided for drainage for each vertical tank.

In each vertical tank, the water and general liquids contained in the tank should be very clean; this need involves the renovation of this water and, therefore, a water discharge offset by a clean water entry.

Moreover this water discharge evidently involves draining the sludge, impurities and plastic particles of higher density than water that, therefore, are found near the bottom of the tanks, frequently associated to other particles of lower density.

Consequently, the function of the aforesaid adjustable outlet is to control the amount of water (together with disposable sludge, impurities, plastic particles and others) that must exit the vertical tank to be conveyed toward the strainer.

In existing facilities, the structure of each adjustable outlet is as follows: an elbow pipe fitting connects the lower vertex of the liquid tank to the top of a strainer located below the maximum water level of the tank; the bottom of this strainer (which is where the drainage mouth thereof is located) is at a level below the liquid inlet and between both areas there is a wire gauze, a perforated plate, a grill or similar object, placed at a tilted position and used to separate the water from the aforesaid disposable sludge, impurities, plastic particles, etc.

The amount of water that exits the tank is proportional to the smaller inner cross-section of the elbow pipe fitting and to the height difference between the water level in the tank and the height of the aforesaid inlet to the strainer.

Therefore, one of the factors indicated in the above paragraph must be varied in order to regulate the aforementioned amount of water; since it is not easy to change the aforesaid height difference (which would involve vertical displacement of heavy bodies), the regulation must be obtained by varying the aforesaid cross-section and this variation is not possible by means, for example, of a butterfly valve or other kind of existing valve, since they could easily result in a jam due to the unavoidable retention of the sludge, impurities and plastic particles present in the water.

Consequently, this necessary regulation is handled in typically existing facilities by using a variety of gauges and making appropriate substitutions on a case-by-case basis.

Evidently this regulation has disadvantages of some importance, since it is necessary to have an initial valve upstream from the place where these gauges are located and a second valve downstream from the place where these gauges are located; to close the valves with the resulting halt of the process; to replace the gauge and to reopen the aforesaid valves in order to continue the process.

The invention is intended to overcome these drawbacks; this purpose is achieved with equipment of the type indicated above, in which the equipment is characterised in that it has a pump equipped with the following: an inlet connected to this outlet, an outlet, several moveable devices suitable for promoting suction flow of this water and these materials through this inlet and a propulsion flow of this water and these materials through this outlet, and a second motor suitable for driving these moveable devices, with this second motor being of suitable speed to allow variation such that this speed variation of this second motor causes a variation in the flow rate of these flows.

Other advantages and characteristics of the invention can be seen from the following description in which, without being limiting, a preferable way to implement the invention is described, with mention made of the accompanying diagrams. The figures show the following:

FIG. 1, a schematic, partial cross-section elevation view of part of the equipment contemplated in this invention, with the view cut on the right.

Figure 2:
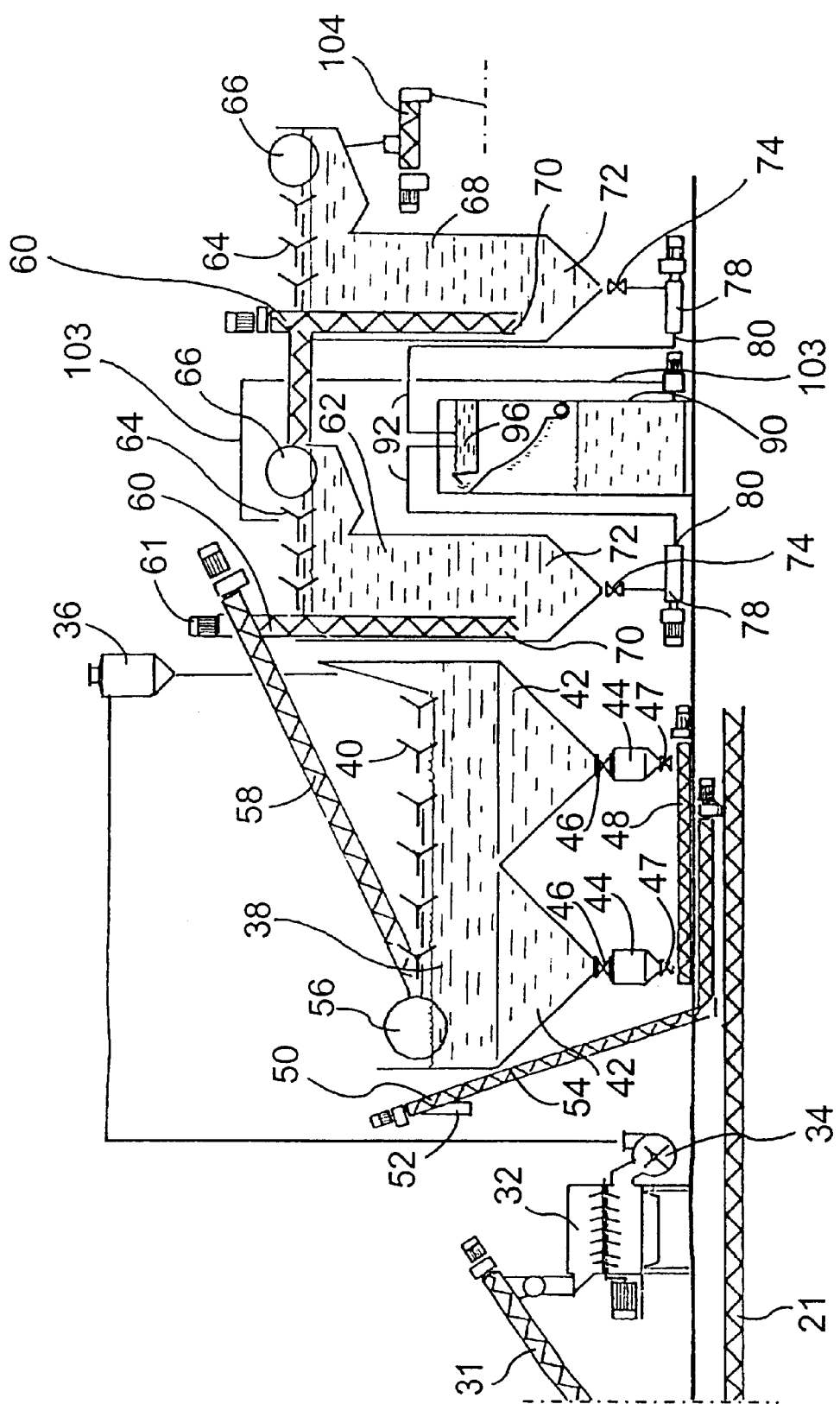

FIG. 2, a schematic elevation view of the other part of the equipment, from the above cut and in continuation of the above FIG. 1; this view is also cut on the right.

Figure 3:
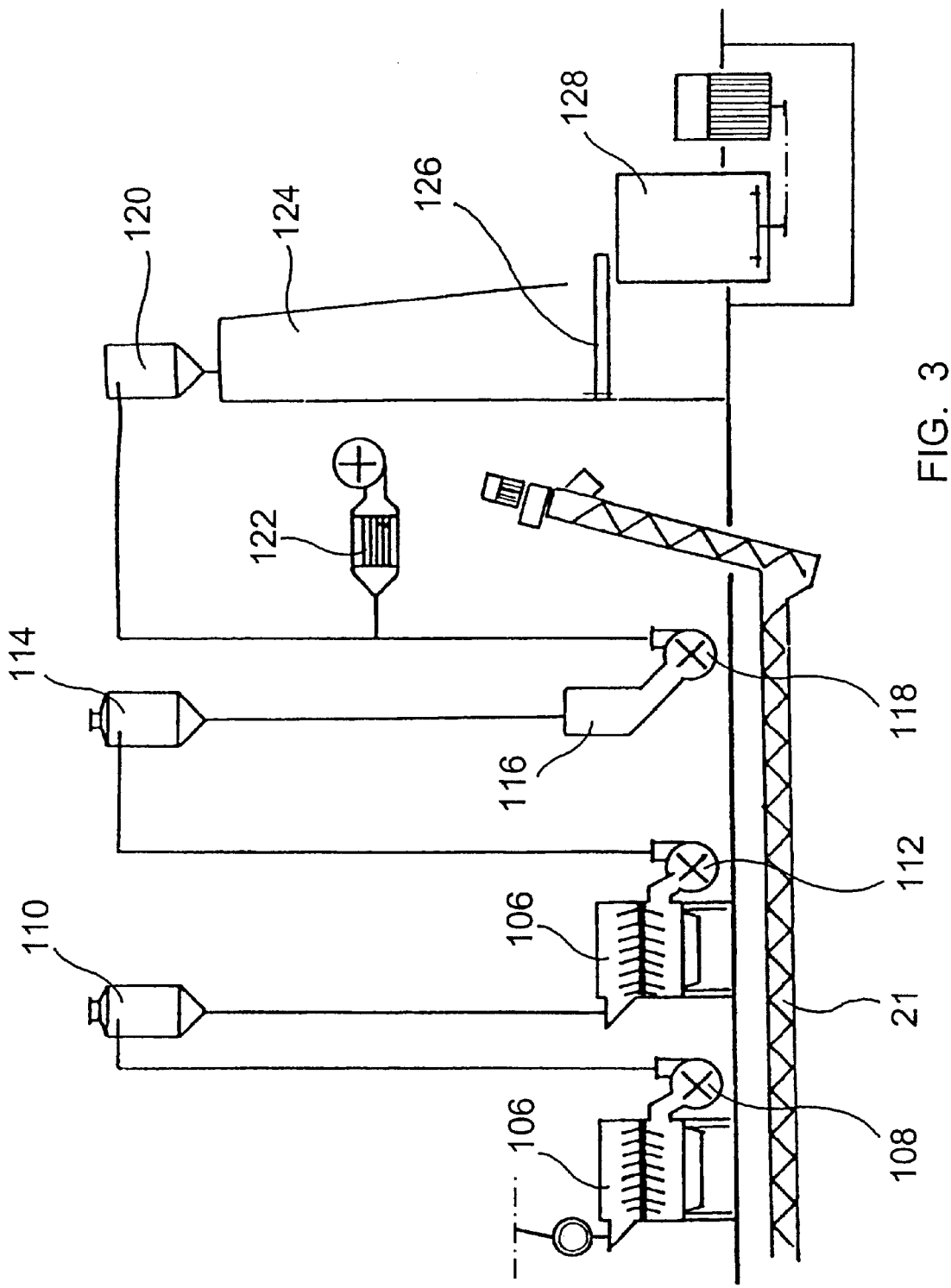

FIG. 3, a schematic elevation view of the rest of the equipment, from the last cut mentioned above and in continuation of the above FIG. 2.

Figure 4:
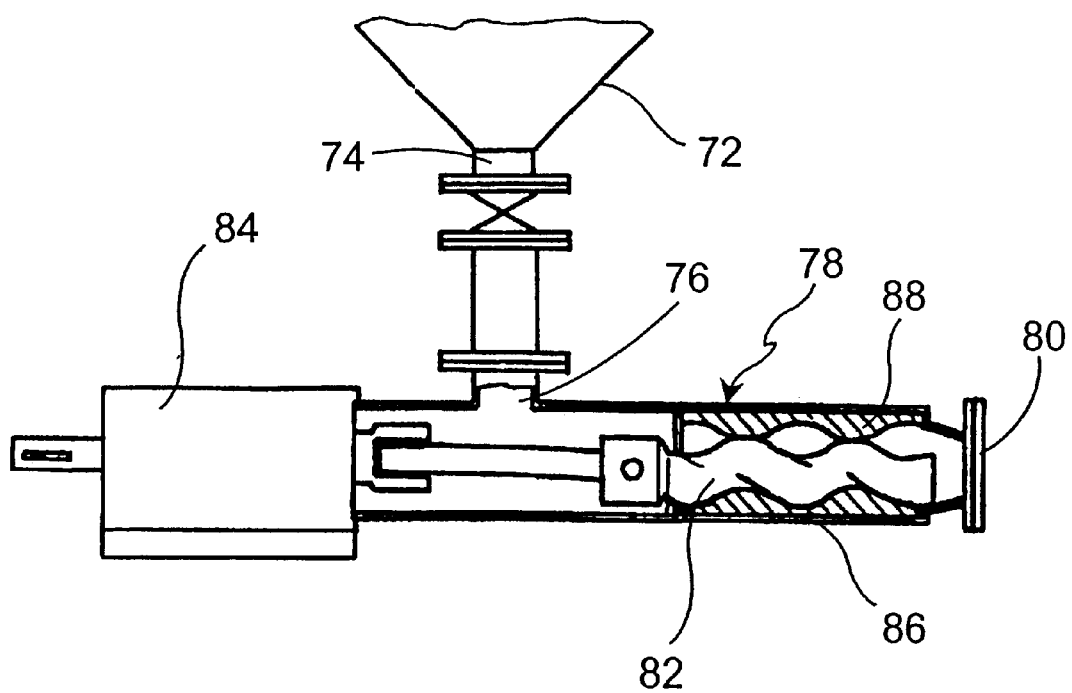

FIG. 4, a schematic cross-section of one way of embodiment of the pump.

Figure 5:
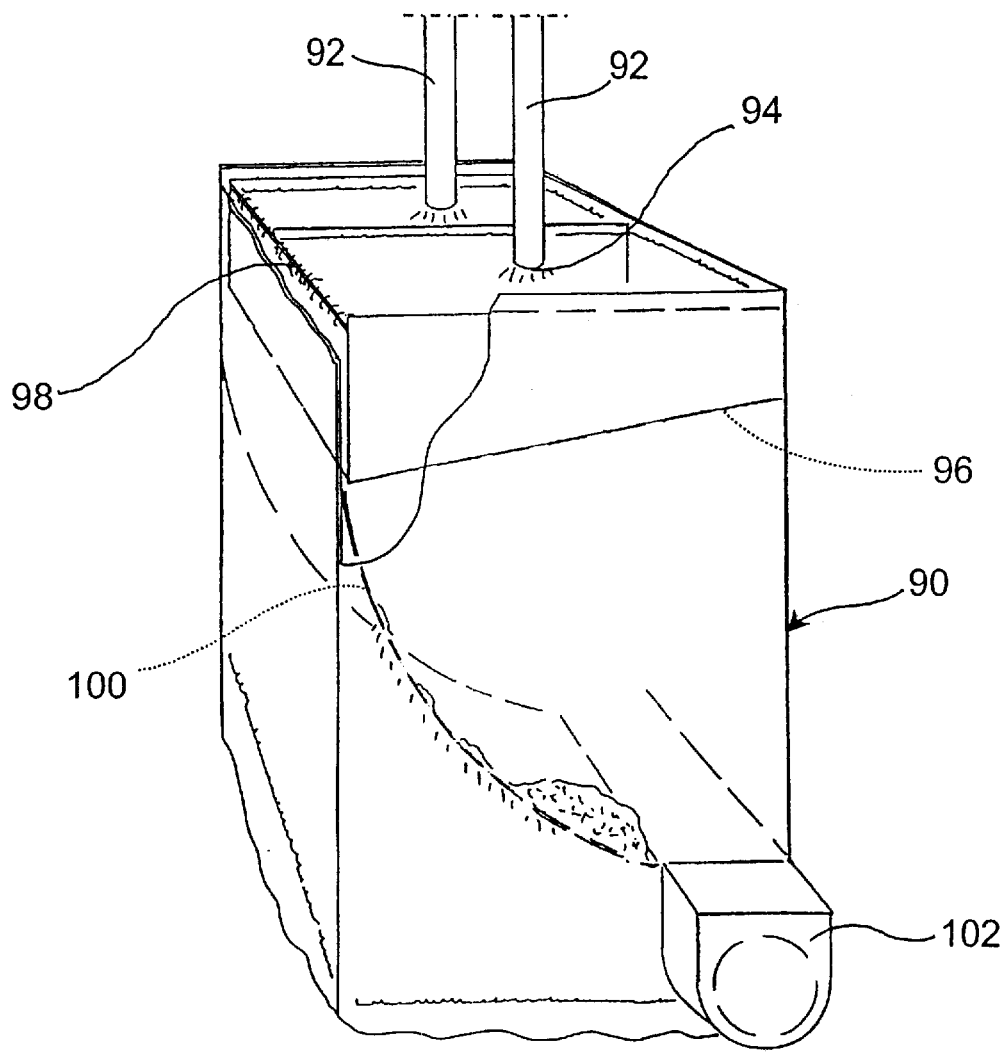

FIG. 5, a perspective schematic view of the tank that receives water from the separating tanks.

Figure 6:
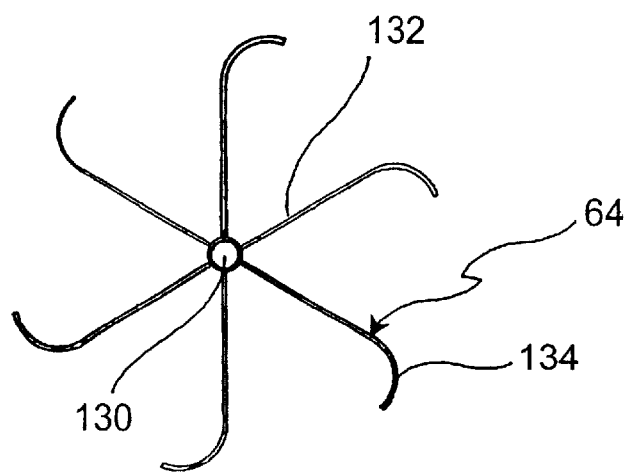

FIG. 6, an axial view of the unit comprising the shaft and the blades joined to this shaft that move the plastic particles from the surface of the water in the separating tanks.

Figure 7:
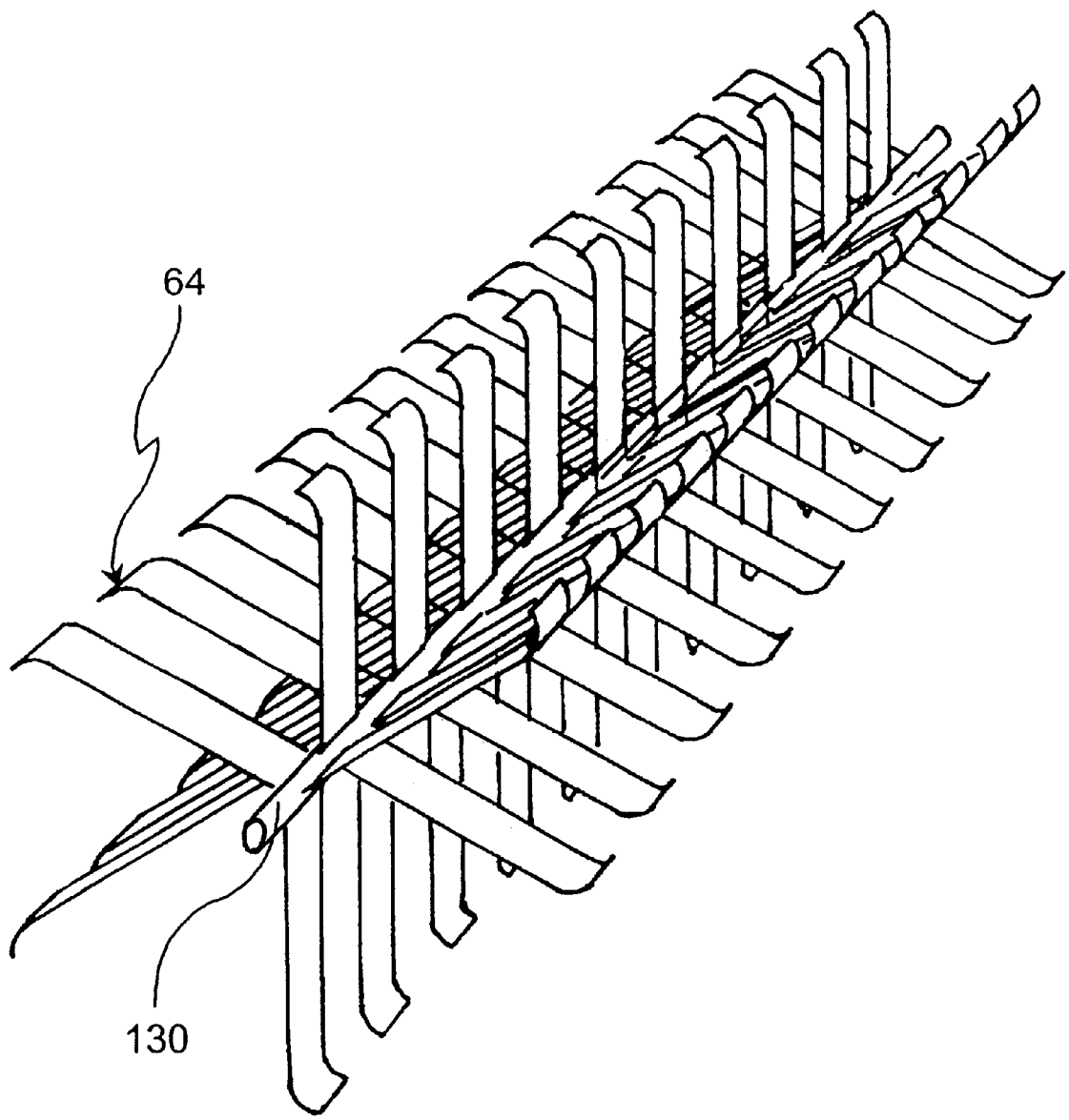

FIG. 7, a perspective view of a unit analogous to the one shown in FIG. 6.

The facility contemplated herein comprises a conveyor belt 2 that preferably starts near a cavity 4 in order to avoid excess dispersion of the plastic material being recycled; the belt 2 lifts this material until the latter is emptied into breaker 6; this comprises a drum and teeth and turns preferably in alternate directions to destroy the plastic sheeting until it is in pieces of a substantially reduced size with respect to the initial dimensions of the plastic.

The aforesaid plastic pieces exit breaker 6 through the bottom of the latter and fall onto a second conveyor belt 8, that lifts them to a recipient 10 which acts as a separator device; recipient 10 contains water and collects impurities with a higher density than plastic such as soil, metals and others. In recipient 10, the plastic material being recycled floats and the impurities and also some of the plastic pieces with a higher density than water, fall by gravity to the bottom of recipient 10. This bottom should preferably be composed of two conical or inverted pyramid-shaped cavities 12 that are provided with several end outlets 14 that allow unusable materials to be expelled; each of these end outlets 14 provide access to a worm conveyor 16 driven by respective motor reducers 18; the two worm conveyors 16 are connected to a central valve 19 that is connected with another worm conveyor 20 that is preferably connected to a general waste collector 21 that is shown schematically. When the end outlets 14 are open, the central valve 19 is closed and vice versa.

The water in recipient 10 marks an upper surface near where the plastic pieces being recycled float; the equipment provides for the existence of several blades 22 that lead these plastic pieces toward an edge of the container that is opposite the one where they entered; this container surface is of some size and the movement produced by blades 22 is slow; this is intended to promote the precipitation of the denser materials. Another conveyor belt 24 is located near the above opposite edge, with this belt collecting the pieces of floating materials (plastic and non-plastic) and carrying them to a crusher mill 26.

This mill 26 has a structure 28 that provides an upper access 30 that preferably allows the plastic material to enter and also allows the water to enter. The mill is not shown in detail; it has a bottom onto which the incoming plastic falls and this bottom is composed of a plate with a concavity pointed downward and equipped with holes, which obviously tend to allow the passage of plastic pieces having dimensions conditioned to the diameter of the holes themselves. In front of the aforesaid concavity of the drilled plate, there is a rotary shaft equipped with radial blades; the mill 26 also has several stationary blades, logically placed near the shaft. When the radial blades turn, they travel near the stationary blades, thereby breaking the plastic pieces until achieving the desired dimensions, which are on the order of several millimetres. These plastic pieces or particles are wet since, as already indicated, water enters (adjustable according to need) the structure 28 containing the mill 26.

In order to collect the small plastic pieces that have passed through the plate holes mentioned in the above paragraph, there is another worm conveyor 31 that allows these pieces to be carried to a centrifuge 32 (FIG. 2).

This centrifuge 32 is used to process and wash the wet plastic pieces and particles; it is composed of a prism-shaped plate with small holes of reduced size that allow the water in the plastic pieces to cross over, but prevents the pieces themselves from passing.

The inside of the prism formed by the plate contains a bladed shaft that turns in such a way that it propels the material particles toward the plate shell. Through one end inlet of this plate, the wet plastic sheeting material can enter the prism formed by the plates; in this area, the material pieces or particles are cleaned by the frictional effect of centrifuge 32 as they travel the length of the prism until exiting through a second outlet opposite the inlet.

Immediately after this outlet there is a fan 34 used to extract these material pieces and carry them to a cyclone 36, after which there are two separating ponds 38, in parallel position; only the front pond can be seen in the figures. For reasons of space and transport, this cyclone 36 should preferably empty at the edge of the ponds 38 that is located to the right on FIG. 2.

These ponds 38 are highly analogous to recipient 10, since they contain water on the top of which the plastic pieces float; several blades 40 (referred to again below) make these plastic pieces move forward from the aforesaid inlet edge toward the opposite edge.

The bottom of these ponds should preferably also be formed by two inverted pyramid-shaped cavities 42, equipped with identical lower tanks 44 that collect the waste components that weigh more than the reusable plastic pieces; the connection between the cavities 42 and the lower tanks 44 is regulated by means of several initial regulation devices (or valves) 46; in addition, several other regulation devices (or valves) 47 allow the lower tanks 44 to be connected to another lower drainage duct 48 (equipped with a worm conveyor) that is normally connected indirectly to the general waste collector 21 that was mentioned earlier.

The effect of regulation devices 46, 47 frequently causes problems and in order to avoid them, an arm 50 (directly or indirectly) should preferably be connected to the lower drainage duct 48; this arm 50 is in a raised position and has an outlet 52 that reaches a height above the water level in the ponds 38 (first level); a worm conveyor 54 causes the waste products to rise along the length of arm 50: The layout described avoids decompression problems in particular.

In addition, valve 46 and valve 47 are simultaneously open while the equipment is operating; duct 48 is also intended to form part, either direct or indirectly, of the general collector 21.

There is a bucket conveyor 56 that allows the plastic pieces that have moved forward by the effect of the blades 40 to be collected. This bucket conveyor 56 is used to deliver these pieces to a worm conveyor 58, which is of variable speed.

This worm 58 is connected to a feeder 60 that is descendant, preferably in the vertical direction and is moved by an initial motor 61 in which the speed can be varied; the feeder 60 is composed on another worm conveyor in a tubular device that is inserted into a tank 62 in which a new separating operation of non-usable materials should take place. The tank 62 contains water and also in this case, there are partially cleaned plastic pieces or particles on its surface, with other blades 64 (also referred to again later on) that make these pieces advance toward a bucket conveyor 66 that, as applicable, delivers these pieces to at least one other tank 68, substantially similar to tank 62; both are described below at the same time.

In both tanks 62, 68 the outlet 70 of the respective feeder 60 is located near the respective bottom 72 of the tank 62, 68. In this way, the plastic pieces and materials received from the worm conveyor 58 are forced, on the one hand, to enter tanks 62, 68 at a certain distance from the surface of the tank water; on the other hand, also at a certain distance from the tubular part of the tanks 62, 68 and also at a certain distance from outlet 74 of the bottom 72 of tanks 62, 68. These bottoms 72 are of conical shape and their lower culmination is composed of outlets 74. The example included shows that the two tanks are working in series, in other words that the material to be recycled flows through one of the tanks first and is then carried to the other tank.

The plastic pieces enter tanks 62, 68 through the respective feeder 60; those with a lower density than water (pieces of light material) tend to rise inside the tank whereas those having a higher density than water tend to fall. Nevertheless, some of the latter are either of a density only slightly higher than water or are adhered to other plastic pieces of light material; consequently, these pieces have very little mobility, which hinders the necessary separation between the pieces of light material (namely, those that are recyclable) and the heaviest pieces, that must be disposed of.

In order to handle this situation, each of the outlets 74 is connected to the inlet 76 of a pump 78 (FIG. 4). This pump 78 also has an outlet 80 and several moveable devices 82, which are driven by a second motor 84 which has a speed that can also be varied; all this in such a way that the indicated movement causes suction flow of the water and the materials located in the tanks 62, 68 and this suction flow enters in pump 78 through the inlet 76; this flow can be controlled at will and on a continuous basis, such that a variation in its speed does not require that the equipment be stopped. At the same as the suction flow is produced, the pump 78 promotes an propulsion flow of the water itself or the materials it contains, such that this propulsion flow crosses the outlet 80; the subsequent course of this propulsion flow is indicated later on. Obviously the fact that the motor 84 is of variable speed means that a variation in this speed will cause a variation in the intensity of the aforesaid suction and propulsion flows.

This results in a descendent current of water (along with the materials contained therein) inside each tank 62, 68; this current causes significant activation of the movement of the plastic pieces of reduced mobility, which were referred to earlier; in addition, this encourages the separation of the light material pieces adhered to other material pieces of heavier density than water. The result is a significant improvement in the separation process of both types of materials, along with a decrease in the amount of time used in the process.

If the suction flow is too strong, however, it will also suction pieces of light material, overcoming the tendency of the latter to rise inside the tank, an effect that is undesirable.

It is also not convenient that the speed of the first motor 61 of the feeder 60 be high, since in this case an excess amount of plastic material will be delivered, thereby causing an excess concentration of such plastic material near the bottom 72 of the separating tank 62, 68; this may also cause the pieces of light material to be affected by the suction flow.

In order to avoid this possible drawback, the invention also includes the possibility to make manual variations in the first motor 61 and/or the second motor 84 (especially in the latter), depending on the suctioned plastic materials that are logically also found in the aforesaid propulsion flow. In order to facilitate the observation of these plastic materials, an easy observation point thereof is provided, from which the necessary variations in the aforesaid speeds of motor 61 and/or motor 84 can be sequenced and timed, until the plastic material content being removed with the water is suitable. The materials that are rejected are those that prevent a good final quality once the plastic is recycled and converted into pellets. This is the object precisely of this synchronised purification that is handled by the vertical worm conveyor driven by the motor 61 and the moveable devices driven by the motor 84.

Logically the water loss taking place through the outlet 72 is offset by the intake of water; this point is also referred to later on; nevertheless this water renovation improves and benefits the separation process.

The timing to which we have alluded causes appropriate suction flow and, therefore, correct separation of any materials that could harm the quality of the recycled material contemplated in the facility being described.

In the non-limiting example shown in FIG. 4, the pump 78 is a helical pump equipped with a rotor 82 (acting as a movable device) having a straight cross-section of a constant, circular shape and a helical shaping; this rotor turns inside a stator 86, that is coated internally with an elastic or flexible material 88 which gives it a configuration that is also helical, of a long cross-section and with a thread equal to that of rotor 82. At all times there is a continuous line of alternative contact between the rotor 82 and the stator 86, such that when the pump 78 is operating due to the action of the motor 84, the turning motion of the rotor causes the spaces delimited between the rotor itself and the internal surface of the stator to move in the axial direction, thereby producing some suction and propulsion effects.

Logically the same results can be achieved with many other types of pumps among which, by way of a non-limiting example, we could cite other kinds of pumps such as peristaltic pumps, double-diaphragm pneumatic pumps, flexible hose pumps, flexible impeller pumps, lobular rotary pumps and others.

Between the two tanks 62, 68 there is a connection resembling connecting vessels (not shown) wherein there is an outlet duct that works when there is overflow at a certain level, causing the levels of the two tanks to become equal while also regulating the maximum level for the two tanks.

The existence of a tank 90 shown in FIG. 2 and with more detail in FIG. 5 is preferable. The outlet 80 of each of the pumps 78 is connected to a duct 92 that receives the aforesaid propulsion flow and each duct 92 has a drainage outlet 94 that empties onto several trays 96 such that the received water flows over the edge 98 of these trays that is lower than the other edges. The overflow along the entire length of the edge 98 causes the water and plastics to fall along the entire width of a cover 100 that is sloped downward and provided with a number of openings; the cover 100 can be of perforated plate or mesh with the openings in any case being of sufficiently reduced size to prevent the material pieces being discarded to pass through them.

As a result, the water passes through the cover 100 whereas the material pieces to be discarded slip along the entire length of the cover 100, until being received by a new worm conveyor 102 that, as applicable, carries them to the general collector 21. By means of a duct 103 and several suitable pumps, the recovered water in the tank 90 can be carried to the top of the separating tanks 62, 68 thereby forming a circuit that is practically closed.

A press 104 should also preferably be located at the outlet from the tank 68 used to drain the incoming product, causing a significant amount of water separation with respect to the plastic being recycled.

The equipment also includes at least several centrifuges 106 to receive the usable incoming plastic material from the press 104; these centrifuges 106 can be of the same type as the centrifuge 32 described above, although they operate at different speeds. After the first centrifuge 106, there is a fan 108 that sends the plastic material to the buffer 110 to subsequently reach the second centrifuge where it is subject to a new drying process.

A fan 112 and a buffer 114 are again used to carry the plastic material to a tank 116, from where it is suctioned by a new fan 118 to enter the buffer 120, after receiving hot air from the heater 112. From the buffer 120, the plastic material passes to another tank 124. There is a conveyor belt 126 used to dose and transport the material from a binder 128, where the drying and the final binding of the recycled plastic is performed.

The blades 64 (FIGS. 6 and 7) are attached to a rotary shaft 130 and preferably have a section 132 immediately before the shaft from which they protrude radially, followed by a curved end section 134 that traces a convex pattern which is located earlier in the turning direction of the shaft 130; the blades that are located in a single stretch of the shaft 130 are arranged at regular intervals and are offset at an angle with respect to the blades attached on contiguous stretches of shaft. All this achieves a smooth forward motion of the plastic pieces located near the water surface in the separating tanks and prevents undesirable turbulence.

What is claimed is:

1. Equipment for the recycling of polyolefinic plastic sheeting material, said equipment comprising: at least one breaker mechanism (6) for a plastic material being recycled; at least one initial separating device (10) to separate, by means of flotation, material of higher density than said plastic material; at least one crusher mill (26) to reduce said plastic material to small particles; at least one water separating tank (62, 68) that, is equipped with several blades (64) for surface displacement of said small particles and, is equipped with a bottom (72) containing a first outlet (74); each separating tank (62, 68) being equipped with a feeder (60) suitable for receiving the plastic material that has been crushed and, at least partially, separated from materials of higher density, said feeder (60) comprising a worm conveyor contained in a tubular device, delivering such material near said bottom (72), with a first motor (61) of variable speed, said first motor being suitable to regulate said delivery; means to separate said plastic material from is water; and means to bind the plastic material, characterized in that it comprises a pump (78) equipped with: an inlet (76) connected with said first outlet (74); a second outlet (80); several movable devices (82) suitable for promoting suction flow of the water and said materials through said inlet (76) and a propulsion flow of the water and said materials through said second outlet (80); and a second motor (84) suitable for driving said movable devices (82), said second motor (84) being of a suitable variable speed such that a speed variation of said second motor (84) causes a variation in the flow rate of the flows, and where said water sucked through said inlet (76) is recirculated through a duct (103) up to the top of said water separating tank (62, 68).

2. Equipment according to claim 1, characterized in that speed variations and synchronizations of said first motor (61) and/or said second motor (84) are done manually, depending on the content of plastic materials in said propulsion flow.

3. Equipment according to claim 2, characterized in that said equipment has suitable means to facilitate the observation of said materials content in said propulsion flow.

4. Equipment according to at least one of claims 1 to 3, characterized in that said second outlet (80) of said pump (78) is connected by means of a duct (92) suitable for receiving said propulsion flow and emptying said propulsion flow through a drainage outlet (94); there being: a tray (96) located below said drainage outlet (94) equipped with an overflow edge (98) that marks one length and a cover (100) with a width on the order of said length, located below said overflow edge (98), that is sloped downward and equipped with a number of openings suitable for preventing the cross-ways passage of said materials.

5. Equipment according to claim 4, characterized in that said pump is a helical pump (78) comprising a cam rotor (82) of constant circular straight cross-section, said cam rotor (82) being suitable for turning inside a stator (86) of helical shape, coated internally with an elastic or flexible material (88), existing at all times an alternative contact line between said cam rotor (82) and said stator (86), wherefore the turning of the cam rotor (82) inside the stator (86) encourages delimiting spaces between the cam rotor (82) and the inner surface of the stator (86) that is axially displaced; there being a motor component (84) suitable for promoting the turning of said cam rotor (82) at a number of speeds.

6. Equipment according to claim 5, said equipment comprises at least one separating pond (38) suitable for holding water up to a first level and small material particles, said pond (38) being equipped with a bottom (42) composed of at least one inverted pyramid-shaped cavity connected at the bottom with a tank (44), with there being a first regulation device (46) to regulate the connection between said pond (38) and said tank (44) and a second regulation device (47) to regulate the connection between said tank (44) and a lower drainage duct (48), characterized in that said lower drainage duct (48) is connected in turn with an arm (50) placed at a raised position and that has an expulsion outlet (52) that reaches a height above the first level of is the water, there being a worm conveyor (54) suitable for encouraging rejected material particles to rise inside said arm (50).

7. Equipment according to claim 6, characterized in that said equipment is equipped with at least one centrifuge (32, 106) for processing wet plastic in which said centrifuge (32, 106) comprises a prism-shaped plate shell that defines a space and is equipped with holes, the reduced size of which prevent said particles from passing; a suitable initial inlet to allow the wet plastic sheeting material to enter said space; a shaft with blades, that can turn inside said plate shell and is suitable for propelling said particles against said plate shell; and a second mouth suitable for allowing the plastic material inside said space to exit.

8. Equipment according to claim 7, characterized in that said blades (40, 64) are attached in successive stretches from a turning shaft in a first turning direction, such that: each blade (40, 64) has a section near the shaft arranged radially with respect to the same and a curved end section that traces a convex pattern which is positioned earlier in said first turning direction; each of the blades (40, 64) attached to a single section on the same shaft forms equal angles with the contiguous blades attached in the same section; and the blades (40, 64) that are attached in a single section and offset at an angle with respect to the blades (40, 64) attached to an immediate section.

* * * * *